United States Patent
Bogaerts et al.

(10) Patent No.: US 8,853,109 B2
(45) Date of Patent: Oct. 7, 2014

(54) PHASE-SEPARATED SODA-LIME-SILICA GLASS

(75) Inventors: Michel Bogaerts, Jumet (BE); Stephane Godet, Brussels (BE)

(73) Assignees: AGC Glass Europe, Brussels (BE); Universite Libre de Bruxelles, Brussels (BE)

( * ) Notice: Subject to any disclaimer, the term of this patent is extended or adjusted under 35 U.S.C. 154(b) by 162 days.

(21) Appl. No.: 13/500,021

(22) PCT Filed: Oct. 26, 2010

(86) PCT No.: PCT/EP2010/066117
§ 371 (c)(1),
(2), (4) Date: Apr. 3, 2012

(87) PCT Pub. No.: WO2011/051257
PCT Pub. Date: May 5, 2011

(65) Prior Publication Data
US 2012/0196735 A1    Aug. 2, 2012

(30) Foreign Application Priority Data

Oct. 26, 2009  (EP) ................................... 09174013

(51) Int. Cl.
| | |
|---|---|
| C03C 10/00 | (2006.01) |
| C03C 10/14 | (2006.01) |
| C03C 3/078 | (2006.01) |
| C03C 4/00 | (2006.01) |
| C03B 32/02 | (2006.01) |

(52) U.S. Cl.
CPC ............ *C03C 10/0009* (2013.01); *C03C 4/005* (2013.01); *C03B 32/02* (2013.01)

USPC ........................................ 501/4; 501/2; 501/72

(58) Field of Classification Search
USPC .............................................. 501/2, 4–10, 72
See application file for complete search history.

(56) References Cited

U.S. PATENT DOCUMENTS

| | | | | |
|---|---|---|---|---|
| 3,841,856 A | * | 10/1974 | Bondarev et al. | 65/33.7 |
| 5,698,019 A | * | 12/1997 | Frank et al. | 106/35 |
| 6,599,606 B1 | * | 7/2003 | Zou | 428/64.2 |
| 2006/0142138 A1 | * | 6/2006 | Sakamoto | 501/7 |

FOREIGN PATENT DOCUMENTS

| | | |
|---|---|---|
| BE | 793 827 | 7/1973 |
| GB | 1 254 260 | 11/1971 |

OTHER PUBLICATIONS

U.S. Appl. No. 13/500,226, filed Apr. 4, 2012, Bogaerts, et al.
"Microstructure and TCE Control for Glass Ceramic Substrates by Controlled Glass in Glass Phase Separation," IBM Technical Disclosure Bulletin, vol. 33, No. 4, pp. 446-447, (Sep. 1, 1990).
Jewell, J.M., et al., "The role of water content in the phase separation of soda-lime silicate glasses: the effect of heat treatment on properties," Physics and Chemistry of Glasses, vol. 32, No. 3, pp. 81-86. (Jun. 1, 1991).

(Continued)

*Primary Examiner* — Noah Wiese
(74) *Attorney, Agent, or Firm* — Oblon, Spivak, McClelland, Maier & Neustadt, L.L.P.

(57) ABSTRACT

The invention relates to a glass having $SiO_2$, $Na_2O$ and CaO as main components, which comprises two amorphous phases having different compositions, one of the two phases being in the form of inclusions dispersed in the volume of the other phase and comprising crystalline particles. Such a glass has good mechanical strength, in particular good resistance to scratch propagation and allows improved tempering. This glass furthermore has a pleasant aesthetic appearance.

17 Claims, 1 Drawing Sheet

(56) References Cited

OTHER PUBLICATIONS

Burnett, D.G., et al., "Liquid-liquid phase separation in the soda-lime-silica system," Physics and Chemistry of Glasses, vol. 11, No. 5, pp. 125-135, (Oct. 1, 1970).

Strnad, Z., et al., "Nucleation and crystallisation in the soda-lime-silica system," Physics and Chemistry of Glasses, vol. 14, No. 2, pp. 33-36, (Apr. 1, 1973).

International Search Report Issued Feb. 3, 2011 in PCT/EP10/66117 Filed Oct. 26, 2010.

* cited by examiner

PHASE-SEPARATED SODA-LIME-SILICA GLASS

1. FIELD OF THE INVENTION

The field of the invention is that of glassy materials in the soda-lime-silica system. More precisely, the invention relates to a soda-lime-silica glass which has good mechanical strength, in particular good resistance to scratch propagation, and which allows an improved tempering. The glass according to the invention has these properties coupled with a pleasant aesthetic appearance.

2. DESCRIPTION OF THE PRIOR ART

Glass, in its broadest definition, is a material which is amorphous, free of crystalline order and isotropic. During the manufacture of such a type of amorphous material comprising constituents of a crystallizable compound, a crystallization phenomenon, known as devitrification, may occur. When a crystallization occurs accidentally or in an uncontrolled manner, it leads to the formation of crystals that are relatively large, of very diverse sizes and that are distributed heterogeneously in the glassy matrix, often in the form of needles at the surface. The presence of such crystals results in an optical defect (reduction of the transparency) and/or a mechanical defect (reduction of the resistance to mechanical stresses) of the resulting glass.

Furthermore, another undesirable phenomenon may also occur during the manufacture of a glass. This is liquid/liquid phase separation, or demixing, which corresponds to the growth of amorphous phases of different compositions. It is well known that, in many molten silicates, it is possible to observe two liquid phases of different compositions, which is then referred to as immiscibility. The phase diagrams of many molten liquids display regions of immiscibility or miscibility gaps that are stable above the liquidus temperature: this is especially the case for alkaline-earth metal silicates, in the case of silica-rich compositions. In other cases, this immiscibility is observed below the liquidus temperature (metastable immiscibility), for example in alkali metal silicates. A homogeneous glass, heated to a temperature at which phase separation occurs, will therefore separate into two glasses having different compositions. There are two types of phase separation that generate interfaces between the amorphous phases which have different morphologies. These two types of interfaces are illustrated in FIG. 1: (a) either the separation takes place via a nucleation/growth mechanism and, in this case, the separation generates isolated inclusions, referred to as "droplets" which are dispersed in a glassy matrix, (b) or the separation takes place via spinodal decomposition (spontaneous separation) and, in this case, it results morphologically in the appearance of inclusions, often described as "vermiculites", generating an intertwined structure with a more diffuse boundary between the two amorphous phases. Phase separation, when it occurs accidentally in a glass, modifies the texture of this glass and leads to undesirable optical and mechanical heterogeneities. The phase separation phenomenon in the particular case of a glass belonging to the $Na_2O$—$CaO$—$SiO_2$ system was investigated by Burnett et al., (*Physics and Chemistry of Glasses*, Vol. 11, No. 5, October 1970).

Over decades, the composition of soda-lime-silica glass has moreover been optimized in order to limit these unwanted devitrification and phase-separation phenomena and to thus obtain a completely amorphous, glassy material.

Nevertheless, despite the property of transparency of an inorganic glass, the absence of microstructural interfaces leads to a brittleness of the material. This intrinsic mechanical brittleness results in low resistances to mechanical impacts. In particular, the aesthetic appearance of the glass is often greatly deteriorated by the formation of scratches or abrasions during the use thereof and/or the transport thereof. Furthermore, even if a glass is hard, it is brittle and not very tough, that is to say that it is not resistant to the propagation of scratches or cracks following the absence of discontinuities and of grain boundaries.

Equally, a soda-lime-silica glass, which does not conduct heat very well, registers high expansion at the location where it is heated. The expanded glass exerts a pressure on the surrounding parts which leads to rupture of the glass object, that is to say "thermal breakage".

These days, the thermal "tempering" of glass, very widely used in the soda-lime-silica glass industry, makes it possible to improve the mechanical strength and thermal resistance.

Unfortunately, this heat treatment, once carried out, does not allow the subsequent cutting of the product if it is in the form of a sheet, for example. In this case, it is important that the machining and the final edging be carried out before the tempering. The latter point represents a major drawback for glass products requiring improved mechanical strength, such as tiled floors or worktops, and which often require cutting for the placement thereof. Furthermore, the tempering of a soda-lime-silica glass is tricky or even impossible for glass known as "thin glass", that is to say glass in the form of a sheet having a thickness approximately less than 2.5 mm. Indeed, the compressive stress at the surface of the order of 100 MPa induced by the tempering is impossible for such glass sheets. This limitation originates from the value of the coefficient of thermal expansion CTE of the soda-lime-silica glass, of the order of $90 \times 10^{-7}/°$ C. It is indeed well known, in the world of glassy materials, that the tempering is facilitated when the CTE increases. A higher CTE value for the soda-lime-silica glass would thus enable an improved tempering and would, for example, give access to tempered thin glass.

One known way of improving the mechanical strength of a glass, and in particular its resistance to scratch propagation, is the application of a surface layer deposited on the glass. This technique aims to benefit from the specific mechanical strength of said layer with respect to an external mechanical stress. Nevertheless, the thickness of the protective layer is limited and any macroscopic scratch exposes unprotected glass to the exterior surroundings or leads to the creation of crack initiation in an embrittled region of the glass. Furthermore, the deposition of such a layer only improves the scratch resistance of the glass and does not modify its coefficient of thermal expansion in any way.

In the field of glassy materials, glasses comprising an amorphous glassy phase and a crystalline phase are well known in the art. These glasses result from the controlled homogeneous devitrification of a glass. The conversion to a semi-crystalline ceramic, also known as a glass-crystalline material or commonly as a glass-ceramic material, is obtained from a glass via controlled heat treatment which makes it possible to produce a high density of small crystals dispersed homogeneously in the volume of the material. Unlike uncontrolled devitrification, this homogeneous distribution of the crystals makes it possible to improve the mechanical properties of the product. Indeed, certain glass-ceramics have a high scratch resistance and a high tensile strength and also an absence of expansion at high temperature, which makes them practically invulnerable to heat shocks. By controlling the proportion and the nature of the various crystals, the CTE of the glass-ceramic can be adjusted and very low values are often achieved.

On the basis of these properties, numerous applications have been developed for such types of glass. Glass-ceramic is, for example, used for the manufacture of hobs or chimney walls.

For decades and since the breakthrough of glass-ceramics onto the market in the middle of the 1950s, several companies have developed glass-ceramics based on the partial crystallization of a glass. Known compositions are based, for example, on $Li_2O$—$SiO_2$ (silicate) systems or $Li_2O$—$Al_2O_3$—$SiO_2$ (aluminosilicate) systems. Moreover, they often have one or more nucleating agents such as $TiO_2$, $ZrO_2$ or $P_2O_5$. On the other hand, the prior art does not propose any glass-ceramic in the $Na_2O$—CaO—$SiO_2$ soda-lime-silica system. Moreover, it is maintained in the scientific literature, and in particular in the article by Strnad et al., published in *Physics and Chemistry of Glasses* (Vol. 14, No. 2, April 1973), that it is impossible to produce a homogeneous crystallization in the volume of a glass belonging to this system and that only an uncontrolled heterogeneous crystallization may be obtained in this case.

While many known glass-ceramic materials have mechanical strength and heat resistance properties far greater than the amorphous soda-lime-silica glass, they nonetheless remain much more expensive to produce and hence cannot be transposed to standard applications for economical reasons. Owing to its ease of production and to the low cost price of the raw materials, soda-lime-silica glass specifically retains a predominant position in the glass industry and in particular for the building, motor vehicle and decoration markets.

Hence, there is an obvious economic advantage in producing a soda-lime-silica glass having increased mechanical properties, in particular good resistance to scratch propagation, and which allows improved tempering.

Moreover, glass known as "opal glass" comprising a glassy phase and a crystalline phase are also well known in the art and are obtained by introducing an opacifier, conventionally fluorides, into a silicate, an aluminosilicate or a borosilicate, via an intentional or controlled crystallization of crystals (in the case of the addition of fluorides, the crystals are conventionally $CaF_2$ or NaF). Opal glass, highly present in everyday life, is opaque and diffuses light. It is therefore mainly used in decorative applications and in the manufacture of consumer products such as tableware or light fittings. Conventional opal glass, sold under the trade mark Arcopal®, is milky white and is a fluorosilicate. Nevertheless, the introduction of conventional opacifiers such as fluorides into glass compositions presents two major drawbacks: (i) an undeniable negative impact on the environment and (ii) an increased corrosion phenomenon of the refractory materials of the melting furnaces.

Hence there is also an interest in obtaining a soda-lime-silica glass that has a pleasant aesthetic appearance, comparable to that of opal glass but which is free of fluorine.

3. OBJECTIVES OF THE INVENTION

One objective of the invention is, in particular, to overcome the drawbacks of the prior art by solving the technical problem, namely to obtain a soda-lime-silica glass, that is to say belonging to the $Na_2O$—CaO—$SiO_2$ system, having increased mechanical properties, in particular good resistance to scratch propagation, and which also allows improved tempering.

Another objective of the invention is to provide a soda-lime-silica glass having, in addition to the desired mechanical strength and to the fact that it allows improved tempering, the aesthetics desired as a function of the application for which it is intended. The invention proposes, in this context, to provide a soda-lime-silica glass which is transparent or alternatively has a pleasant milky opaque appearance comparable to that of opal glass.

Finally, one objective of the invention is to provide a solution to the disadvantages of the prior art which is simple, economical and has a low environmental impact.

4. SUMMARY OF THE INVENTION

In accordance with one particular embodiment, the invention relates to a glass having $SiO_2$, $Na_2O$ and CaO as main components and which comprises two amorphous phases having different compositions, one of the two phases being in the form of inclusions dispersed in the volume of the other phase.

According to the invention, said inclusions comprise crystalline particles.

Thus, the glass according to the invention makes it possible to overcome the drawbacks of the materials from the prior art and to solve the stated technical problem. Specifically, the inventors have demonstrated that it was possible, by generating a phase-separation phenomenon coupled with a crystallization at the amorphous/amorphous interface and/or in the volume of the inclusions created by the phase separation to obtain a glass in the soda-lime-silica system with improved mechanical properties, in particular good resistance to scratch propagation and which has an aesthetically acceptable or pleasing appearance. This result is surprising in so far as the transparency and homogeneity necessary in common applications of soda-lime-silica glass (architecture, motor vehicles, etc.) have always led a person skilled in the art to envisage only amorphous materials and have always encouraged a person skilled in the art to optimize the composition of the glass and also the manufacturing process thereof in order to prevent or at least limit the unwanted devitrification and phase-separation phenomena.

Furthermore, the inventors have demonstrated, very surprisingly, that a soda-lime-silica glass having phase separation coupled with a crystallization made it possible to achieve CTE values higher than a corresponding completely amorphous glass.

The phase-separated soda-lime-silica glass according to the invention thus has an increased mechanical strength, in particular good resistance to scratch propagation, and it also allows improved tempering. This glass is, furthermore, economically and aesthetically acceptable for standard applications in the building industry or the motor vehicle industry.

The invention also relates to a sheet constituted of the glass as described previously and also to an article comprising at least one such sheet.

The present invention will be described in greater detail and in a non-restrictive manner.

5. DESCRIPTION OF AN EMBODIMENT OF THE INVENTION

Figure 1:
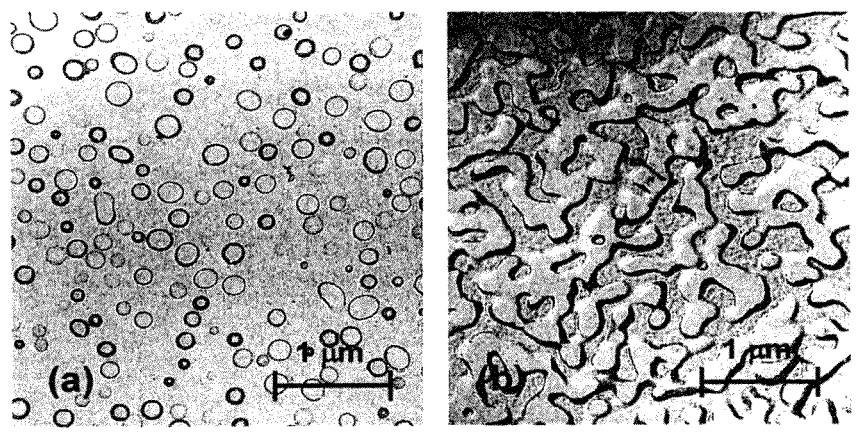
FIG. 1 represents an image obtained by electron microscopy of phase-separated glasses from the prior art.

The glass according to the invention is a soda-lime-silica material, that is to say a glass that belongs to the $Na_2O$—CaO—$SiO_2$ system. The glass of the invention hence has $SiO_2$, $Na_2O$ and CaO as main components. In particular, the glass of the invention comprises, as a percentage by total weight, 60 to 85% of $SiO_2$, 1 to 25% of $Na_2O$ and 1 to 25% of CaO. Additionally, it may comprise other components in minor amounts such as $K_2O$, $MgO$, $Al_2O_3$, $BaO$, various dyestuffs or residues originating from additives that modify the redox ($NaNO_3$, $Na_2SO_4$, coke, etc.). Preferably, these components, if they are present in the glass of the invention, will not exceed, in total, 15% by weight of the glass.

According to one particular embodiment of the invention, the glass is free of the element fluorine. Such a soda-lime-silica glass hence has a low environmental impact, in particular compared to opal glass, the opacifier of which is conventionally based on one of these components. The expression "free of" means, in the present invention, that the glass only comprises the element fluorine in trace amounts. Preferably, the glass only comprises the element fluorine in an amount of less than 500 ppm by weight.

According to one particular embodiment of the invention, the glass is also free of the element lithium. Since lithium oxide is more expensive than oxides such as $Na_2O$ and CaO, such a glass of soda-lime-silica type hence represents an undeniable economic advantage, in particular compared with glass-ceramic materials known from the prior art which comprise, usually, lithium oxide. The expression "free of the element lithium" means that the glass of the invention only comprises this element in trace amounts. Preferably, the glass only comprises the element lithium in an amount of less than 500 ppm by weight.

Alternatively, according to another particular embodiment of the invention, the glass may comprise lithium in amounts which may range up to around 3% by weight, expressed in the form of oxide. The presence of lithium in these amounts makes it possible to reduce the viscosity of the glass in the melt state and to thus favour the crystallization.

According to another preferred embodiment, the glass of the invention is free of the element lead. The expression "free of the element lead" means that the glass of the invention only comprises this element in trace amounts.

According to another preferred embodiment, the glass of the invention is free of the element boron. The expression "free of the element boron" means that the glass of the invention only comprises this element in trace amounts.

The glass according to the invention comprises two amorphous phases having different compositions, one of the two phases being in the form of inclusions distributed in the volume of the other phase, known as the matrix phase.

According to the invention, the soda-lime-silica glass of the invention comprises two glassy phases having different compositions. In particular, the glass of the invention comprises a glassy phase in the form of inclusions which is enriched in $SiO_2$ and dispersed in the other matrix glassy phase which is enriched in network-modifying elements, such as sodium and calcium.

In accordance with one particular embodiment of the invention, the inclusions are in the form of droplets or on the form of vermiculites.

According to the invention, the inclusions comprise crystalline particles.

The glass of the invention may comprise crystalline particles in the form of an assembly of several particles or in isolated form.

In accordance with one particular embodiment, the crystalline particles have a size between 5 nm and 500 µm. Preferably, in order to obtain a glass which is transparent, the crystalline particles have a size between 5 nm and 500 nm. Preferably, in order to obtain a glass having a milky opaque appearance, comparable to that of opal glass, the crystalline particles have a size between 500 nm and 500 µm.

According to the invention, the crystalline particles are found:
  (i) at the surface of the inclusions, or
  (ii) in the volume of the inclusions, or
  (iii) both at the surface and in the volume of the inclusions.

The expression "crystalline particle at the surface of an inclusion" is understood to mean a particle which has crystallized at the amorphous/amorphous interface.

Figure 2:
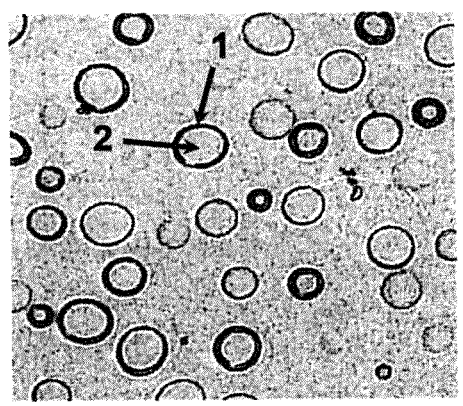
FIG. 2 represents the position of the crystalline particles in accordance with the invention.

The position of the crystalline particles is illustrated in FIG. 2 in the case of a droplet-type phase separation:
  (i) at the surface of the inclusions (position 1), or
  (ii) in the volume of the inclusions (position 2), or
  (iii) both at the surface and in the volume of the inclusions (positions 1 and 2).

Advantageously, the presence of the crystalline particles at the surface of the inclusions makes it possible to further improve the mechanical properties, in particular the resistance of the glass to crack propagation. The presence of the crystalline particles at the surface of the inclusions also makes it possible to limit excessive crystallization in the volume of the inclusions and thus to prevent the growth in volume of said inclusions.

According to another particular embodiment of the invention, when crystalline particles are found at the surface of the inclusions, they may be constituted of compounds which may crystallize from the overall composition of the glass such as diopside ($CaMgSi_2O_6$), devitrite or wollastonite ($CaSiO_3$). Likewise, they may be constituted of compounds added in a small amount to the overall composition of the glass such as $BaO$, $TiO_2$, $ZrO_2$, $Nb_2O_5$, etc.

According to yet another particular embodiment of the invention, when crystalline particles are found in the volume of the inclusions, they are essentially constituted of $SiO_2$. Impurities, such as components originating from the composition of the glass and that are essentially in the matrix phase, may be present therein in a minimal amount. If such impurities are present in the crystalline particles, they are preferably present in an amount of less than 5% by weight in total. More preferably, they are present in an amount of less than 2% by weight in total.

According to this particular embodiment, the crystalline $SiO_2$ particles may be in the form of a single polymorph of this component. Alternatively, the crystalline $SiO_2$ particles may be in the form of several $SiO_2$ polymorphs. The glass according to the invention may also comprise, at the same time, particles in the form of a single $SiO_2$ polymorph and particles in the form of several $SiO_2$ polymorphs.

Examples of an $SiO_2$ polymorph are quartz ($\alpha$ or $\beta$) cristobalite ($\alpha$ or $\beta$ or tridymite ($\alpha$ or $\beta$).

According to one particular embodiment of the invention, the crystalline particles of $SiO_2$ are essentially in the form of cristobalite.

The glass according to the invention has increased mechanical strength, in particular good resistance to scratch propagation, compared to a corresponding completely amorphous glass.

The mechanical strength of a material is often expressed in terms of hardness and toughness. The hardness characterizes the ability of a material to be scratched or abraded (expressed in MPa or GPa). The toughness is the ability of a material to withstand the propagation of an existing crack. The brittleness (B) may supplement these parameters and corresponds to the ratio between hardness (H) and toughness (Kc), H/Kc (expressed in $\mu m^{-0.5}$). In the present invention, the hardness and the brittleness are measured by Vickers indentation.

Preferably, the glass according to the invention has a brittleness of less than $6.5\ \mu m^{-0.5}$. By way of comparison, this value is around 7 $\mu m^{-0.5}$ for a completely amorphous soda-lime-silica glass, with no particular treatment.

Furthermore, the glass has a higher CTE than a corresponding completely amorphous glass.

The partial heating or partial cooling of a material may, if it has low thermal conductivity, lead to stresses which may give rise to thermal breakages, as is the case for completely amorphous soda-lime-silica glass.

The magnitude of this expansion or contraction phenomenon of a material respectively during partial heating or partial cooling is conventionally defined by the coefficient of linear thermal expansion. This coefficient of thermal expansion or CTE corresponds to the elongation per unit length for a variation of 1° C. (expressed as °$C^{-1}$).

Preferably, the glass according to the invention has a CTE, measured for a temperature variation ranging from 25 to 300° C., which is greater than $100\times10^{-7}$/° C. By way of comparison, the CTE, for the same range of temperatures, of a completely amorphous soda-lime-silica glass, with no particular treatment, is of the order of $90\times10^{-7}$/° C.

Due to this higher CTE value, the glass of the invention allows an improved tempering. A glass that allows improved tempering is understood to be a glass which requires, in order to obtain a compressive stress at the surface equivalent to that of a corresponding completely amorphous glass, tempering at a lower temperature and/or for a shorter time. Hence, this advantage permits an energy saving which results in an additional positive effect of the invention from an environmental and economic viewpoint. Similarly, a glass which allows improved tempering is also understood to mean a glass which has, for equivalent heat treatment, a compressive stress at the surface which is greater than that of a corresponding completely amorphous glass. Finally, a glass which allows improved tempering is also understood to mean a glass which allows the tempering of "thin" sheets made from this glass.

The soda-lime-silica glass according to the invention may be obtained by any process capable of generating a phase-separation phenomenon coupled with a crystallization at the amorphous/amorphous interface and/or in the volume of the inclusion created by the phase separation.

In particular, the glass according to the invention may be obtained by two routes: (i) a controlled heat treatment of the glass in the melt state (ceramization), or (ii) a controlled annealing of a glass of the same overall composition but solidified beforehand in the completely amorphous state.

In both cases, a heat treatment known as ceramization is carried out. Ceramization generally comprises, in a known manner, the following steps, which may be repeated several times:

a) raising the temperature up to the temperature T (ceramization plateau) which is situated beyond the nucleation range;
b) maintaining the temperature T for a time t;
c) rapid cooling down to ambient temperature.

The glass according to the invention may be used for manufacturing articles of different shapes and sizes. It may, for example, be used for manufacturing bottles, globes for light fittings and decorative objects.

In particular, the glass of the invention may be used for manufacturing a sheet of said glass. According to this embodiment, and due to its increased resistance to scratch propagation, it may for example be used for a worktop in a kitchen or a laboratory, for tables and shelves or as flooring (paving, walkway). Still in accordance with this embodiment, and due to the fact that the glass also allows improved tempering, it may also be used to manufacture solar panels or motor vehicle glazing units.

An example of an article in accordance with the invention comprising more than one sheet of said glass is a wall which is "laminated" in order to improve the safety aspect, that is to say which comprises two sheets assembled by one or more plastic interlayer films.

The invention claimed is:

1. A glass, comprising:
$SiO_2$, $Na_2O$, and CaO as main components,
wherein the glass comprises two amorphous phases having different compositions,
one of the two amorphous phases being in the form of inclusions and dispersed in the other phase, wherein,
the inclusions comprise crystalline particles,
the crystalline particles are at a surface of the inclusions, within the inclusions, or both,
at least some of the crystalline particles are within the inclusions, and
the crystalline particles within the inclusions are essentially $SiO_2$.

2. The glass of claim 1, comprising, as a percentage by total weight, from 60 to 85% of $SiO_2$, from 1 to 25% of $Na_2O$, and from 1 to 25% of CaO.

3. The glass of claim 1, wherein the inclusions are droplets or vermiculites.

4. The glass of claim 1, wherein the crystalline particles comprise at least one $SiO_2$ polymorph.

5. The glass of claim 1, wherein a brittleness of the glass, measured by Vickers indentation, is less than 6.5 $\mu m^{-0.5}$.

6. The glass of claim 1, wherein a CTE of the glass, measured for a temperature variation ranging from 25 to 300° C., is greater than $100\times10^{-7}$/°C.

7. The glass of claim 1, wherein the glass is free of fluorine.

8. The glass of claim 1, wherein the glass is free of lead.

9. A sheet, comprising the glass of claim 1.

10. An article, comprising the sheet of claim 9.

11. The glass of claim 1, wherein the glass is free of lithium.

12. The glass of claim 1, wherein the glass is free of boron.

13. The glass of claim 1, wherein an impurity content in the crystalline particles is less than 5% by weight.

14. The glass of claim 13, wherein an impurity content in the crystalline particles is less than 2% by weight.

15. A glass, comprising:
$SiO_2$, $Na_2O$, and CaO as main components,
wherein the glass comprises two amorphous phases having different compositions,
one of the two amorphous phases being in the form of inclusions and dispersed in the other phase, wherein,
the inclusions comprise crystalline particles,
the crystalline particles are at a surface of the inclusions, within the inclusions, or both, and
a size of the crystalline particles is between 5 nm and 500 μm.

16. The glass of claim 15, wherein the size of the crystalline particles is between 5 nm and 500 nm.

17. The glass of claim 15, wherein the size of the crystalline particles is between 500 nm and 500 μm.

* * * * *